United States Patent
Kanazawa et al.

(10) Patent No.: US 8,647,729 B2
(45) Date of Patent: *Feb. 11, 2014

(54) DRAW-IRONED ALUMINUM CAN AND METHOD OF PRODUCING THE SAME

(75) Inventors: Seitaro Kanazawa, Yokohama (JP); Shigeya Takahashi, Yokohama (JP); Masashi Ikebuchi, Yokohama (JP); Tomoko Haraguchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/320,577

(22) PCT Filed: Jun. 2, 2010

(86) PCT No.: PCT/JP2010/059358
§ 371 (c)(1),
(2), (4) Date: Nov. 15, 2011

(87) PCT Pub. No.: WO2011/010508
PCT Pub. Date: Jan. 27, 2011

(65) Prior Publication Data
US 2012/0091150 A1    Apr. 19, 2012

(30) Foreign Application Priority Data
Jul. 22, 2009 (JP) ................................ 2009-170861

(51) Int. Cl.
*B29D 22/00* (2006.01)
(52) U.S. Cl.
USPC .......................... 428/35.7; 428/35.8; 428/35.9
(58) Field of Classification Search
USPC .......................... 428/35.7, 35.8, 35.9; 220/626
See application file for complete search history.

(56) References Cited

U.S. PATENT DOCUMENTS

| 6,099,924 A * | 8/2000 | Nakamaki et al. ............ 428/35.8 |
| 6,565,937 B2 * | 5/2003 | Sato et al. .................... 428/35.9 |
| 7,068,163 B2 * | 6/2006 | Sari et al. ................. 340/539.13 |
| 2007/0218226 A1 | 9/2007 | Tadaki et al. |
| 2008/0261063 A1 | 10/2008 | Yamanaka et al. |
| 2012/0091150 A1 * | 4/2012 | Kanazawa et al. ............ 220/626 |

FOREIGN PATENT DOCUMENTS

| JP | 2001-246695 A | 9/2001 |
| JP | 2002-178048 A | 6/2002 |
| JP | 2002-193255 A | 7/2002 |
| JP | 2005-335785 A | 12/2005 |
| JP | 2005-342911 A | 12/2005 |
| JP | 2005-342912 A | 12/2005 |
| JP | 2009078303 A | 4/2009 |
| WO | 00/58087 A1 | 10/2000 |
| WO | 2004/113181 A1 | 12/2004 |

OTHER PUBLICATIONS

The State Intellectual Property Office of P.R. China, "Notification of First Office Action," issued in connection with Chinese Patent Application No. 201080031480.8, dated Apr. 3, 2013.

* cited by examiner

*Primary Examiner* — N. Edwards
(74) *Attorney, Agent, or Firm* — Sughrue Mion, PLLC

(57) ABSTRACT

[Problems] To provide an aluminum seamless can very excellent in stab resistance, corrosion resistance and productivity by using a resin-coated aluminum sheet.
[Means for Solution] A draw-ironed aluminum can having a resin coating on at least the inner surface of the can, wherein the coating resin on the inner surface of the can has a tensile strength of 270 to 420 MPa.

1 Claim, No Drawings

DRAW-IRONED ALUMINUM CAN AND METHOD OF PRODUCING THE SAME

CROSS REFERENCE TO RELATED APPLICATIONS

This application is a National Stage of International Application No. PCT/JP2010/059358 filed Jun. 2, 2010, claiming priority based on Japanese Patent Application No. 2009-170861 filed Jul. 22, 2009, the contents of all of which are incorporated herein by reference in their entirety.

TECHNICAL FIELD

This invention relates to a draw-ironed aluminum can and a method of producing the same. More specifically, the invention relates to a draw-ironed aluminum can excellent in stab resistance, corrosion resistance, close adhesion of resin and productivity, and to a method of producing the same.

BACKGROUND ART

Draw-ironed aluminum cans that have heretofore been widely used for beverage cans are the ones that are obtained by draw-ironing a resin-coated aluminum sheet under dry conditions using neither aqueous lubricant nor coolant, the resin-coated aluminum sheet being the one obtained by coating a metal blank with an organic film.

As the resin-coated metal sheet used for the draw-ironed aluminum cans, there has been used the one on which is laminated a film of polyethylene terephthalate or polyethylene terephthalate/isophthalate. For example, there has been proposed the one having a double-layer resin coating comprising a polyethylene terephthalate/isophthalate containing 3 to 13 mol % of isophthalic acid as an upper layer, and a polyethylene terephthalate/isophthalate containing 8 to 25 mol % of isophthalic acid as a lower layer (patent document 1).

To decrease the cost of production of can bodies in recent years, attempts have been made to decrease the thickness of the can bodies in order to decrease the amount of blank used for the can bodies. When the draw-ironed aluminum can having such a decreased thickness is used as a beverage can that is filled with a content, however, it is probable that the aluminum sheet forming the side wall is ruptured and the content gushes out when the body wall of the can is dented in the step of delivery since the thickness of the body wall has been extremely decreased.

In order to solve the above problem, the present inventors have proposed a seamless aluminum can having improved stab strength (patent document 2).

PRIOR ART DOCUMENT

Patent Document

Patent document 1: JP-A-2001-246695
Patent document 2: WO2004/113181

OUTLINE OF THE INVENTION

Problems that the Invention is to Solve

The above seamless can is satisfactory with respect to excellent stab resistance and flange crack resistance, but is not still satisfactory enough concerning the productivity.

That is, if the resin-coated metal sheet is subjected to the draw-ironing working, there occurs forming defect such as exposure of metal at a high probability due to the generation of metal powder or the generation of heat at the time of working, causing a problem of poor production yield. Therefore, the above seamless can is not still fully satisfactory with regard to productivity and economy. Besides, the defectively formed cans are likely to develop corrosion starting from the portions where the metal is exposed.

It is, therefore, an object of the present invention to provide a seamless aluminum can which does not permit metal to be exposed, features excellent corrosion resistance, improved stab resistance despite of decreased thickness of the resin coating, excellent adhesion of resin and excellence in economy.

Another object of the present invention is to provide a production method which permits the use of a general-purpose polyester resin, use of a resin-coated aluminum sheet of which the thickness can be decreased, effectively lowers the occurrence of metal exposure, and economically produces seamless cans under dry conditions in an environmentally friendly manner.

Means for Solving the Problems

According to the present invention, there is provided a draw-ironed aluminum can having a resin coating on at least the inner surface of the can, wherein the coating resin on the inner surface of the can has a tensile strength of 270 to 420 MPa.

In the draw-ironed aluminum can of the present invention, it is desired that:
1. The resin coating on the inner surface of the can is of a two-layer constitution comprising a surface layer of a highly crystalline polyester resin and a lower layer of a lowly crystalline polyester resin, and a thickness ratio of the surface layer and the lower layer is 1:5 to 9:1; and
2. The highly crystalline polyester resin is an ethylene terephthalate type polyester resin containing a copolymer of isophthalic acid in an amount of not less than 0 mol % but less than 3 mol %, and the lowly crystalline polyester resin is an ethylene terephthalate type polyester resin containing the copolymer of isophthalic acid in an amount of 10 to 18 mol %.

According to the present invention, further, there is provided a method of producing a draw-ironed aluminum can by draw-ironing a resin-coated aluminum sheet having a resin coating on at least the inner surface of the can at a drawing ratio in a range of 1.1 to 2.6 and an ironing ratio in a range of 50 to 80% by using a punch of which the temperature is adjusted to 20 to 50° C.

According to the method of producing a draw-ironed aluminum can of the present invention, the resin-coated aluminum sheet is an aluminum sheet treated with chromium phosphate and having a resin coating of a two-layer constitution comprising a surface layer of a highly crystalline polyester resin and a lower layer of a lowly crystalline polyester resin, a thickness ratio of the surface layer and the lower layer being in a range of 1:5 to 9:1.

Effects of the Invention

In the draw-ironed aluminum can of the invention, the coating resin on the inner surface of the can has a tensile strength in a range of 270 to 420 MPa. Namely, the coating resin has a large strength and a large hardness effectively decreasing the exposure of metal caused by the working.

Therefore, the can body maintains excellent barrier property against the corrosive components and excellent corrosion resistance.

Further, the draw-ironed aluminum can of the invention not only features excellent adhesion of the resin coating but also completely maintains the adhesion of the coating and coverage even after the obtained container is filled with the content and is left to stand, featuring excellent corrosion resistance at the wrap-seamed portion, too.

The draw-ironed aluminum can of the invention, further, excels in stab resistance, effectively prevents damage on the body wall portion even in case the can body is dented and, therefore, effectively suppresses the occurrence of rupture in the body wall during the delivery preventing the content from gushing out. Here, the stab strength measured in Examples described later has a correlation to the circumstances where the body wall is ruptured during the delivery. If the stab strength is not smaller than 95N, the occurrence of rupture in the body wall is suppressed. If the stab strength is not smaller than 98N, the occurrence of fine cracks that trigger the rupture in the body wall, too, can be effectively suppressed.

In the draw-ironed aluminum can of the invention, further, the coating resin on the inner surface side of the can has a tensile strength lying in the above range; i.e., the coating resin has a large strength. It is, therefore, allowed to decrease the thickness of the coating resin to be smaller than the conventionally employed thickness offering such advantages as improved productivity due to decreased occurrence of metal exposure and economy.

The above effects of the invention will also be obvious from the results of Examples described later.

That is, when the resin-coated aluminum sheet of which the coating resin on the inner surface of the can having a tensile strength of less than 270 MPa is draw-ironed, the obtained draw-ironed aluminum can permits metal to be easily exposed, is produced less efficiently, and is not fully satisfactory with regard to corrosion resistance of the body wall and the stab strength (Comparative Example 1). When the coating resin on the inner surface side of the can has a tensile strength in excess of 420 MPa, on the other hand, the adhesion of resin becomes poor (Comparative Example 2). Further, when the resin-coated aluminum sheet same as the one used in Example 1 is subjected to the stretch-draw-forming, the metal easily exposes and the corrosion resistance of the can wall is poor (Comparative Example 3).

On the other hand, the draw-ironed aluminum can of the present invention offers satisfactory results in regard to all of suppressing the exposure of metal, corrosion resistance of the can body wall, stab strength and close adhesion of the resin coating (Examples 1 to 10).

The resin coating on the inner surface of the draw-ironed aluminum can of the present invention may be of a single-layer constitution in addition to the above two-layer constitution. However, the resin coating of the single-layer constitution is inferior in the close adhesion of the resin to the resin coating of the two-layer constitution, and it is obvious that the two-layer constitution is superior (Example 10).

The draw-ironed aluminum can having the above features can be obtained by draw-ironing the resin-coated aluminum sheet at a drawing ratio in a range of 1.1 to 2.6 and at an ironing ratio in a range of 50 to 80% by using a punch of which the temperature is adjusted to 20 to 50° C. Thus, the draw-ironed can of which the coating resin on the inner surface of the can has a tensile strength lying in the above range is produced without permitting the metal to be exposed and maintaining good productivity.

That is, according to the method of producing a draw-ironed can of the present invention, the drawing ratio is set to be small while the ironing amount is set to be large in order to suppress the occurrence of large wrinkles caused by the draw working to thereby effectively suppress the occurrence of metal exposure caused by wrinkles stemming from the drawing. By using the punch of which the temperature is adjusted and, further, owing to the formation of a resin coating having a large strength on the surface that becomes the inner surface, it is allowed to efficiently conduct the draw-ironing working suppressing the occurrence of metal exposure and without using aqueous lubricant or coolant.

MODE FOR CARRYING OUT THE INVENTION (Aluminum Sheet)

As the aluminum sheet to be coated with the resin according to the invention, there can be used any known aluminum sheet or aluminum alloy sheet. Particularly preferably, however, there is used an aluminum alloy sheet containing Mn, Mg, Cu, Si or Fe (hereinafter, the aluminum sheets inclusive of the aluminum alloy sheet are often simply referred to as "aluminum sheets").

That is, Mn works to elevate the recrystallization temperature of aluminum and changes the state of crystallization with Fe in aluminum as a compound improving the corrosion resistance of the can body. It is, therefore, desired to add Mn in an amount of 0.1 to 1.5% (% is by weight, hereinafter the same). If the amount of Mn addition is less than 0.1%, the corrosion resistance of the can body is not obtained to a sufficient degree. If the amount of Mn addition exceeds 1.5%, on the other hand, the formability decreases.

Mg works to improve the strength, formability and corrosion resistance of the can body, and is desirably added in an amount of 0.8 to 5.0%. If the amount of Mg addition is less than 0.8%, the strength of the can body is not obtained to a sufficient degree. If the amount of Mg addition exceeds 5.0%, on the other hand, the formability decreases, and cracks and wrinkles tend to occur.

Cu works to improve the strength of the can body and is desirably added in an amount of 0.01 to 0.8%. If the amount of Cu addition is less than 0.01%, the corrosion resistance of the aluminum can body is not obtained to a sufficient degree. If the amount of Cu addition exceeds 0.8%, on the other hand, the formability decreases.

Si works to precipitate an $Mg_2Si$ intermediate layer to improve the strength and abrasion resistance of the can body, and is, therefore, desirably added in an amount of 0.03% to 0.6%. If the amount of Si addition is less than 0.03%, the strength of the aluminum can body is not obtained to a sufficient degree. If the amount of Si addition exceeds 0.6%, on the other hand, the formability decreases at the time of draw-ironing working.

Fe changes the state of crystallization with Mn in the aluminum alloy sheet as a compound improving the corrosion resistance of the can body. It is, therefore, desired to add Fe in an amount of 0.05 to 0.8%. If the amount of Fe addition is less than 0.05%, the strength of the can body is not obtained to a sufficient degree. If the amount of Fe addition exceeds 0.8%, on the other hand, the formability decreases.

Concretely, there can be desirably used an aluminum alloy of the #3000 series, the #5000 series and the #6000 series specified under "JIS H 4000".

From the standpoint of the strength and formability of the can body, it is, generally, desired that the thickness of the aluminum sheet is in a range of 0.1 to 1.00 mm. After formed, it is desired that the thickness of the can body wall (minimum thickness of aluminum sheet without the resin coating on the can body wall) is not larger than 0.110 mm. If the minimum thickness of the aluminum sheet of the can body wall portion exceeds 0.110 mm, the object of the draw-ironed can cannot be accomplished which is to save resources by decreasing the thickness of the can body wall, and the cost of the can body cannot be decreased.

(Treating the Surface of the Aluminum Sheet)

It is desired that the aluminum sheet has been treated for its surface in order to improve close adhesion to the coating resin during the working.

As the surface treatment, there can be exemplified any known surface treatment executed so far for the aluminum sheets with chromium phosphate or any other organic or inorganic surface treatments by dipping the cold-rolled aluminum sheet, by spraying or by coating. Desirably, however, the aluminum sheet is treated with the chromium phosphate.

When a film is formed on the aluminum sheet by the treatment with the chromium phosphate, it is desired that the amount of chromium is in a range of 5 to 40 mg/m$^2$ and, more preferably, 15 to 30 mg/m$^2$ as the total chromium amount from the standpoint of close adhesion of the laminated resin film during the working. If the total chromium amount is smaller than the above range, the effect of the surface treatment is not sufficient, and the close adhesion of the resin coating during the working may become smaller than that of when the total chromium amount is in the above range. If the total chromium amount is larger than the above range, on the other hand, it becomes disadvantageous in economy and aggregation breakdown occurs causing the close adhesion to be rather decreased.

(Resin Coating)

As the resin coating to be applied onto the surface that becomes the inner surface of the can made from the surface-treated aluminum sheet, there can be used any thermoplastic resin provided the tensile strength of the resin coating after the can has been formed lies in a range of 270 to 420 MPa and, particularly, 300 to 390 MPa.

The resin coating may comprise a single layer of polyester resin. In the present invention, however, it is particularly desired that at least the surface that becomes the inner surface of the can is of a two-layer constitution comprising a surface layer of a highly crystalline polyester and a lower layer of a lowly crystalline polyester resin. Upon the forming, therefore, the oriented crystals can be imparted to the resin coating. As a result, the resin coating on the inner surface of the seamless can possesses a high strength and hardness.

In the present invention, the highly crystalline polyester resin stands for a resin having a minimum half-crystallization time in a range of 10 to 100 seconds as measured by a method described below, and the lowly crystalline polyester resin stands for a resin having a minimum half-crystallization time in a range of 300 to 1100 seconds. These resins are both crystalline resins.

The method of measuring the minimum half-crystallization time is as described below.

The resin pallets are maintained at 30° C., are elevated up to 290° C. by using a differential scanning calorimeter (DSC) at a temperature elevating rate of 100° C./min. After maintained at 290° C. for 3 minutes, the pellets are quickly quenched down to 0° C. at a cooling rate of 100° C./min. Thereafter, the temperature is elevated up to a predetermined temperature at a temperature elevating rate of 100° C./min, and is maintained constant at that temperature to obtain "an endothermic amount—sustenance time curve". In the "endothermic amount—sustenance time curve", the time at which the endothermic amount becomes a peak is defined to be a "half-crystallization time". This is measured at a temperature between 100° C. and 200° C., and a value of the smallest "half-crystallization time" is regarded to be "the minimum half-crystallization time".

[Surface Layer]

As the highly crystalline polyester for constituting the surface layer of the resin coating on the surface that becomes the inner surface of the can, it is desired to use an ethylene terephthalate type polyester resin having the above-mentioned minimum half-crystallization time in a range of 10 to 100 seconds and, particularly, containing a copolymer of isophthalic acid as the dicarboxylic acid component in an amount of not less than 0 mol % but less than 3 mol %. If the amount of the isophthalic acid is larger than the above range, the strength is not imparted to the resin coating to a sufficient degree. Therefore, the stab resistance, suppression of the metal exposure and corrosion resistance of the can body wall may decrease, and the barrier effect cannot be sufficiently imparted against the adsorption of flavor components from the content.

In the invention, the ethylene terephthalate type polyester resin stands for the one that contains a terephthalic acid as the carboxylic acid component in an amount of not less than 50 mol % and, particularly, not less than 70 mol %, and contains an ethylene glycol component as the alcohol component in an amount of not less than 50 mol % and, particularly, not less than 70 mol %.

So far as the above composition is satisfied, further, the ethylene terephthalate type polyester resin may contain other copolymer components in small amounts. As the carboxylic acid components other than the isophthalic acid and terephthalic acid, though not limited thereto only, there can be exemplified naphthalene dicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid and dimeric acid.

As the alcohol components other than the ethylene glycol, on the other hand, there can be exemplified such alcohol components as propylene glycol, 1,4-butanediol, neopentyl glycol, 1,6-hexylene glycol, diethylene glycol, triethylene glycol, cyclohexane dimethanol, bisphenol A ethylene oxide adduct, glycerol, trimethylolpropane, pentaerythritol, dipentaerythritol and sorbitan.

The highly crystalline polyester resin should have a molecular weight in a range of forming a film and an intrinsic viscosity (IV) of not less than 0.55 dL/g and, particularly, in a range of 0.6 to 1.0 dL/g as measured by using a phenol/tetrachloroethane mixed solvent as a solvent from the standpoint of barrier property against corrosive components and mechanical properties.

As the polyester resin for constituting the surface layer of the resin coating according to the present invention, there can be preferably used a homopolyethylene terephthalate or a polyethylene terephthalate that contains isophthalic acid in an amount of less than 3 mol % and, particularly, less than 2 mol %.

Further, any of the surface layer, the lower layer that will be described below or the single layer can be blended with a known blending agent for films, e.g., anti-blocking agent such as amorphous silica, pigment such as titanium dioxide, antistatic agent, antioxidant or lubricant according to known recipe.

[Lower Layer]

The lowly crystalline polyester resin that constitutes the lower layer of the resin coating on the surface that becomes the inner surface of the can is a polyester resin having a minimum half-crystallization time in a range of 300 to 1100 seconds as described above and is, particularly desirably, an ethylene terephthalate type polyester resin containing a copolymer of isophthalic acid as the dicarboxylic acid component in an amount of 10 to 18 mol % and, particularly, 13 to 17 mol %. If the amount of the isophthalic acid is smaller than the above range, adhesion of the resin to the metal (aluminum sheet) after the working may become insufficient. If the amount of the isophthalic acid is larger than the above range, on the other hand, the strength cannot be imparted to the resin coating to a sufficient degree permitting the metal to be exposed much and deteriorating the corrosion resistance of the can body wall.

Other copolymerizable components that can be used for the lowly crystalline polyester resin are the same as those mentioned above for the highly-crystalline polyester resin.

The lowly crystalline polyester resin should have a molecular weight in a range of forming a film and an intrinsic viscosity (IV) of not less than 0.55 dL/g and, particularly, in a range of 0.6 to 1.0 dL/g as measured by using a phenol/tetrachloroethane mixed solvent as a solvent.

[Single Layer]

According to the present invention as described above, the resin coating can be constituted as a single layer. In this case, however, the single layer of polyester resin must possess both the resin strength and close adhesion of the resin after the working and, therefore, it is desired to use an ethylene terephthalate type polyester resin containing isophthalic acid in an amount in a range of 7 to 12 mol %. It is, of course, allowable to add a small amount of copolymerizable component like the resin coating of the two-layer constitution mentioned above.

[Layer Thickness]

In the present invention, when the resin coating is constituted in two layers comprising the surface layer of the highly crystalline polyester resin and the lower layer of the lowly crystalline polyester resin, it is desired that the thickness ratio of the surface layer and the lower layer is in a range of 1:5 to 9:1 and, particularly, 1:3 to 4:1.

If the thickness of the surface layer is larger than the above range, the resin strength becomes so great that the adhesion of the resin after the working becomes poor at the intensely worked portions such as flange portion, and corrosion may occur at the wrap-seamed portion. If the thickness of the surface layer is smaller than the above range, on the other hand, the resin strength so decreases that the metal tends to be easily exposed due to the draw-ironing working, and corrosion resistance decreases on the can body wall.

It is, further, desired that the thickness of the resin coating is in a range of 10 to 40 μm and, particularly, 14 to 35 μm in either case of two-layer constitution or single-layer constitution. If the thickness is larger than the above range, the adhesion of resin after the working becomes poor at the intensely worked portions such as flange portion, and corrosion may occur at the wrap-seamed portion. If the thickness is smaller than the above range, on the other hand, the metal tends to be easily exposed due to the draw-ironing working, and corrosion resistance decreases on the can body wall.

[Resin-Coated Aluminum Sheet]

In the present invention, the resin coating of the above two-layer constitution or of the single layer is applied onto the surface of the aluminum sheet that becomes the inner surface of the can relying on a known method of lamination. Desirably, the resin coating is formed in an unstretched and unoriented state by laminating or co-extruding a multi-layer cast film from the standpoint of, particularly, workability.

The multi-layer cast film is laminated by introducing the polyester resins such as PET/IA chips that constitute the surface layer and the lower layer into separate extruders, heat-melting and extruding them into sheets through a die, and cooling and solidifying the sheets on a casting drum.

The co-extruded coating, on the other hand, is formed by using two extruders, feeding the PET/IA resins of the surface layer and the lower layer into the die and extruding them.

According to the present invention, the multi-layer cast film is laminated or co-extrusion-coated in the form of a laminated-layer film attaining a strong interlayer adhesion without using adhesive and contributing to improving the workability. The invention, however, is not to limit the use of the adhesive but permits the use of a known adhesive primer for adhering the resin coating to the aluminum sheet.

The adhesive primer is a phenol-epoxy type coating material comprising a resol-type phenol-aldehyde resin derived, for example, from various phenols and from a formaldehyde, the phenols exhibiting excellent adhesiveness to both the metal blank and the film, and a bisphenol-type epoxy resin.

Specifically, the adhesive primer is a coating material that contains the phenol resin and the epoxy resin at a weight ratio of 50:50 to 1:99 and, particularly, 40:60 to 5:95. The adhesive primer layer is formed, usually, maintaining a thickness of 0.01 to 10 μm. The adhesive primer layer may be formed in advance on the surface-treated aluminum sheet or may be formed on a polyester film.

In the case of the single layer, too, the resin coating can be formed by laminating the cast film or by the extrusion-coating like in the case of the two-layer constitution.

The surface of the aluminum sheet that becomes the outer surface of the can may be coated with a coating material that is used for the ordinary cans or with a resin film coating that has heretofore been used for the resin-coated metal sheets.

The resin film coating may be of a single-layer constitution but is desirably of a double-layer constitution comprising the surface layer of a polyethylene terephthalate/isophthalate containing an isophthalic acid in an amount of 7 to 14 mol % from the standpoint of close adhesion of the printing ink and the resin strength, and the lower layer of a polyethylene terephthalate/isophthalate containing the isophthalic acid in an amount of 10 to 18 mol % from the standpoint of close adhesion of the resin after the working. Further, a pigment such as titanium dioxide may be added to between the surface layer and the lower layer from the ornamental point of view. Moreover, the resin coating may be of a three-layer constitution including a layer that contains, for example, titanium dioxide in large amounts between the surface layer and the lower layer.

(Method of Producing Draw-Ironed Can)

According to the present invention, the draw-ironed can is formed by subjecting the above resin-coated aluminum sheet to the known draw-ironing working. Prior to the draw-ironing, it is desired to coat the surface of the resin-coated aluminum sheet with a wax-type lubricant that is free of problems from the standpoint of food sanitation and that can be easily volatilized and removed by heating at about 200° C., such as glamour wax, fluidized paraffin, synthetic paraffin, white vaseline, palm oil, various natural waxes or polyethylene wax in order to efficiently conduct the draw-ironing working under dry conditions.

By using a cupping press, a blank is punched from the resin-coated aluminum sheet on which the wax-type lubricant has been applied, and from which a drawn cup is formed by the draw working.

In the present invention, it is desired that the drawing ratio $R_D$ as defined by the following formula (1) lies as a total in a range of 1.1 to 2.6 and, particularly, 2.0 to 2.6. If the drawing ratio is larger than the above range, wrinkles increase due to the drawing, cracks occur in the resin coating, and the metal may be exposed.

$$R_D = D/d \tag{1}$$

wherein D is a diameter of the blank and d is a diameter of the can body wall.

Next, the drawn cup is subjected to the redraw working and the ironing working of one stage or a plurality of stages. Here, in the present invention, it is desired that the temperature of the forming punch has been adjusted to be 20 to 50° C.

If the temperature of the punch is lower than the above range, the wax-type lubricant applied onto the resin-coated aluminum sheet cannot exhibit lubricating property to a sufficient degree. Therefore, the punch is not smoothly removed from the seamless can and cracks occur in the resin coating causing the metal to be exposed. On the other hand, the temperature of the punch which is higher than the above range becomes close to a glass transition temperature of the polyester resin. Therefore, the resin sticks to the punch causing the forming to become defective (breakage of body wall) and the surface of the resin to be coarsened accompanying the forming, increasing the chance of metal exposure.

In the present invention, it is desired that the ironing ratio R represented by the following formula (2) is in a range of 50 to 80%. If the ironing ratio is lower than the above range, the thickness cannot be decreased to a sufficient degree which is not sufficiently satisfactory from the economical point of view. If the ironing ratio is larger than the above range, on the other hand, the metal may be exposed at the limit of resin forming or in the wrap-seam working.

$$R = (tb - tw)/tb \tag{2}$$

wherein tb is a thickness of the surface-treated aluminum, blank sheet, and tw is a thickness of the metal portion of the draw-ironed can from which the resin coating is removed.

The obtained draw-ironed can is subjected to the doming at its bottom portion and to the trimming at its opening edge in a customary manner. As required, the heat treatment is conducted to remove residual distortion from the resin coating and, thereafter, the printing ink and the finishing varnish are applied onto the outer surface of the can body wall, followed by necking and flanging to complete the draw-ironed aluminum can (seamless can) of the present invention.

EXAMPLES

<Minimum Half-Crystallization Time of Resin Pellets on the Inner Surface>

Minimum half-crystallization times of resins on the inner surface used in Examples and in Comparative Examples were as follows:
(1) Homo PET resin (isophthalic acid, 0 mol %) pellets ("IA0" in Table 1): 38 seconds
(2) PET/IA copolymer resin pellets containing 2 mol % of isophthalic acid ("IA2" in Table 1): 70 seconds
(3) PET/IA copolymer resin pellets containing 2.5 mol % of isophthalic acid ("IA2.5" in Table 1): 75 seconds
(4) PET/IA copolymer resin pellets containing 5 mol % of isophthalic acid ("IA5" in Table 1): 113 seconds
(5) PET/IA copolymer resin pellets containing 8 mol % of isophthalic acid ("IA8" in Table 1): 230 seconds
(6) PET/IA copolymer resin pellets containing 10 mol % of isophthalic acid ("IA10" in Table 1): 384 seconds
(7) PET/IA copolymer resin pellets containing 15 mol % of isophthalic acid ("IA15" in Table 1): 642 seconds
(8) PET/IA copolymer resin pellets containing 18 mol % of isophthalic acid ("IA18" in Table 1): 980 seconds <Measuring the Tensile Strength of the Film on the can Body Wall Portion>

To measure the tensile strength of the film on the can body wall portion, the side wall of the obtained seamless can was dipped in hydrochloric acid to isolate the film on the inner surface side of the can body by removing the metal portion. A test piece measuring 5 mm wide and 50 mm long was cut out and was used as a tension test piece. The tension test piece was such that the direction of tension was in the direction of axis of the can (direction of height of the can) and a position where the film thickness was the smallest on the can body wall portion (position of 60 mm above the can bottom in the case of the 350-ml can of Examples) was at the center of the test piece. The gauge length was 20 mm and the speed of tension test was 10 mm/min.

<Evaluating the Ratio of Metal-Exposed Cans>

By flowing an electric current by using an enamel rater, the obtained seamless cans of a number of 200 were measured for their metal exposure and were evaluated as an occupation ratio of cans of current values of not less than 0.5 mA. The measuring conditions of the enamel rater were such that the electric current was measured 4 seconds after the start of applying a voltage of 6 V. The electrolyte was a liquid obtained by adding 0.02% by weight of a surfactant to an aqueous solution containing 1% by weight of sodium chloride. Evaluations were made on the following basis. ○ and Δ represent allowable ranges.
  ○: Occupation ratio was not larger than 1%.
  Δ: Occupation ratio was larger than 1% but was not larger than 3%.
  X: Occupation ratio was larger than 3%.

<Evaluating the Corrosion Resistance of the can Body Wall>

The obtained seamless cans of a number of 100 were filled with an aqueous solution containing "0.2% by weight of citric acid+0.1% by weight of sodium chloride" at room temperature, wrap-seamed and were preserved at 37° C. for 3 months. Thereafter, the cans were opened and the corroded state on the inner surfaces of the can body walls were visually observed. Evaluations were made on the following basis. ○ and Δ represent allowable ranges.
  ○: Corrosion dot was found in none of the cans.
  Δ: Two cans showed corrosion dots of a level practically free of problems.
  X: Four cans obviously showed corrosion.

<Evaluating the Stab Strength>

The obtained seamless can was filled with water and, thereafter, the air was introduced through the opening of the can to impart an internal pressure of 190 kPa. Next, a stab needle was fitted to a compression tester, the seamless can filled with water was so set that the stab needle was at a position where the thickness of the can body wall was the smallest in the direction of height of the can (position 60 mm over the can bottom), and the stab strength of the can body wall portion was measured. The radius at an end of the stab needle was 2.25 mm, and the speed for lowering the stab needle was 200 mm/min. Five cans were tested in each of the Examples and Comparative Examples, and their average values were calculated and evaluated on the following bases. ○ and Δ represent allowable ranges.
  ○: The stab strength was not less than 98N.
  Δ: The stab strength was less than 98N but was not less than 95N.
  X: The stab strength was less than 95N.

<Evaluating the Close Adhesion of Resin>

The obtained seamless cans of a number of 50 were visually observed for their resins on the inner surfaces at the end of the flange to evaluate the close adhesion between the resin and the metal. The evaluation was made on the following basis for those cans that developed resin peeling to the greatest degrees among the 50 cans. ○ and Δ represent allowable ranges.

○: There was no peeling.
Δ: Peeling occurred to a slight degree which, however, was smaller than an allowable level.
X: Peeling occurred to a conspicuous degree.

<Overall Evaluation>

The overall evaluation was rendered on the following basis relying on the evaluations of ratio of occurrence of metal exposure, corrosion resistance of the can body wall, stab strength and close adhesion of the resin. ○ and Δ represent allowable ranges.

○: Evaluations were all "○".
Δ: At least one of the items was evaluated to be "Δ" but no other items were evaluated to be "X".
X: At least one of the items was evaluated to be "X".

Example 1

[Preparation of a resin-coated aluminum sheet]

A surface-treated aluminum alloy sheet to be used as a substrate was obtained by treating both surfaces of a JIS 3104 aluminum alloy sheet of a thickness of 0.28 mm with chromium phosphate in an amount of 20 mg/m² calculated as chromium. Onto the substrate, there were simultaneously heat-laminated an unstretched film comprising a surface layer of a polyethylene terephthalate/isophthalate (PET/IA) copolymer resin containing 2 mol% of isophthalic acid and a lower layer of a PET/IA copolymer resin containing 15 mol% of isophthalic acid (total film thickness of 16 μm) on the surface that became the inner surface of the can and an unstretched film of a PET/IA copolymer resin containing 10 mol% of isophthalic acid and having a thickness of 16 μm on the surface that became the outer surface of the can at a metal sheet temperature of 250° C. Thereafter, a wax-type lubricant was applied thereon to prepare a resin-coated aluminum alloy sheet.

To prepare the unstretched film on the inner surface of the can, copolymerized resin pellets containing 2 mol% of isophthalic acid were fed into a hopper of an extruder to obtain a surface layer resin, and a copolymer resin containing 15 mol% of isophthalic acid was fed to a hopper of another extruder to obtain a lower layer resin. The resins were co-extruded through a T-die and were cooled immediately after the extrusion by using a cooling roll to thereby prepare an unstretched, unoriented and amorphous two-layer resin film having a resin thickness of 16 μm and a thickness ratio of the surface layer of 0.50. The unstretched film on the outer surface of the can was prepared in the same manner as the resin film on the inner surface of the can but forming a single layer of the PET/IA copolymer resin containing 10 mol% of isophthalic acid and having a thickness of 16 μm. Thus, there was prepared an unstretched, unoriented and amorphous single-layer resin film.

[Preparation of a resin-coated seamless can]

The obtained resin-coated aluminum sheet was punched into a disk and was, thereafter, draw-ironed under the working conditions (drawing ratio, ironing ratio, temperature of the punch at the time of ironing working) as shown in Table 1, and was trimmed at its opening edge to obtain a cup. The cup was heated to remove distortion in the resin caused by the forming. Next, the printing ink and the finishing varnish were applied onto the outer surface of the can body wall and were fired in an oven. Thereafter, the cup was subjected to the necking and flanging to obtain a resin-coated seamless can having a can diameter of 66 mm, can height of 122 mm and a capacity of 350 ml. The temperature of the punch at the time of ironing working was expressed by the temperature of the temperature-adjusting water flowing into the punch.

The obtained seamless cans were evaluated for their ratio of occurrence of metal exposure, corrosion resistance of the can body walls, stab strength and close adhesion of the resin. Table 1 shows the specifications of the resins on the inner surfaces of the obtained seamless cans, forming conditions, and evaluated results.

Example 2

A resin-coated seamless can was prepared in the same manner as in Example 1 but using a PET/IA copolymer resin containing 2.5 mol % of isophthalic acid as the surface layer on the inner surface and setting the thickness ratio of the surface layer in the resin on the inner surface to be 0.25, and was evaluated in the same manner as in Example 1. Table 1 shows the specifications of the resins on the inner surface of the obtained seamless can, forming conditions, and evaluated results.

Example 3

A resin-coated seamless can was prepared in the same manner as in Example 1 but setting the thickness ratio of the surface layer in the resin on the inner surface to be 0.80, and was evaluated in the same manner as in Example 1. Table 1 shows the specifications of the resins on the inner surface of the obtained seamless can, forming conditions, and evaluated results.

Example 4

A resin-coated seamless can was prepared in the same manner as in Example 1 but using a homo PET as the surface layer on the inner surface and setting the thickness ratio of the surface layer in the resin on the inner surface to be 0.25, and was evaluated in the same manner as in Example 1. Table 1 shows the specifications of the resins on the inner surface of the obtained seamless can, forming conditions, and evaluated results.

Example 5

A resin-coated seamless can was prepared in the same manner as in Example 1 but using a PET/IA copolymer resin containing 2.5 mol % of isophthalic acid as the surface layer on the inner surface, using a copolymer resin containing 10 mol % of isophthalic acid as the lower layer on the inner surface and setting the thickness ratio of the surface layer in the resin on the inner surface to be 0.50, and was evaluated in the same manner as in Example 1. Table 1 shows the specifications of the resins on the inner surface of the obtained seamless can, forming conditions, and evaluated results.

Example 6

A resin-coated seamless can was prepared in the same manner as in Example 1 but using a PET/IA copolymer resin containing 18 mol % of isophthalic acid as the lower layer on the inner surface and setting the thickness ratio of the surface layer in the resin on the inner surface to be 0.50, and was evaluated in the same manner as in Example 1. Table 1 shows the specifications of the resins on the inner surface of the obtained seamless can, forming conditions, and evaluated results.

Example 7

A resin-coated seamless can was prepared in the same manner as in Example 1 but setting the thickness ratio of the surface layer in the resin on the inner surface to be 0.25, and setting the temperature of the punch at the time of ironing to be 20° C., and was evaluated in the same manner as in Example 1. Table 1 shows the specifications of the resins on the inner surface of the obtained seamless can, forming conditions, and evaluated results.

Example 8

A resin-coated seamless can was prepared in the same manner as in Example 1 but setting the thickness ratio of the surface layer in the resin on the inner surface to be 0.25, and setting the temperature of the punch at the time of ironing to be 50° C., and was evaluated in the same manner as in Example 1. Table 1 shows the specifications of the resins on the inner surface of the obtained seamless can, forming conditions, and evaluated results.

Example 9

A resin-coated seamless can was prepared in the same manner as in Example 1 but setting the drawing ratio to be 2.6, ironing ratio to be 63%, setting the diameter of the can to be 53 mm, the height of the can to be 133 mm and the capacity thereof to be 250 ml, and was evaluated in the same manner as in Example 1. Table 1 shows the specifications of the resins on the inner surface of the obtained seamless can, forming conditions, and evaluated results.

Example 10

A resin-coated seamless can was prepared in the same manner as in Example 1 but forming a single layer of a PET/IA copolymer resin containing 8 mol % of isophthalic acid on the inner surface, and was evaluated in the same manner as in Example 1. Table 1 shows the specifications of the resin on the inner surface of the obtained seamless can, forming conditions, and evaluated results.

Comparative Example 1

A resin-coated seamless can was prepared in the same manner as in Example 1 but using a PET/IA copolymer resin containing 5 mol % of isophthalic acid as the surface layer on the inner surface and setting the thickness ratio of the surface layer in the resin on the inner surface to be 0.25, and was evaluated in the same manner as in Example 1. Table 1 shows the specifications of the resins on the inner surface of the obtained seamless can, forming conditions, and evaluated results.

Comparative Example 2

A resin-coated seamless can was prepared in the same manner as in Example 1 but using a PET/IA copolymer resin containing 10 mol % of isophthalic acid as the lower layer on the inner surface and setting the thickness ratio of the surface layer in the resin on the inner surface to be 0.80, and was evaluated in the same manner as in Example 1. Table 1 shows the specifications of the resins on the inner surface of the obtained seamless can, forming conditions, and evaluated results.

Comparative Example 3

A resin-coated seamless can was prepared in the same manner as in Example 1 but setting the thickness ratio of the surface layer in the resin on the inner surface to be 0.50, changing the forming method into a stretch-draw-forming method, setting the drawing ratio to be 2.7 and setting the ironing ratio to be 30%, and was evaluated in the same manner as in Example 1. Table 1 shows the specifications of the resins on the inner surface of the obtained seamless can, forming conditions, and evaluated results.

TABLE 1

| | | Resins on the inner surface | | | Forming conditions | | | |
|---|---|---|---|---|---|---|---|---|
| | | Kind | | Layer ratio | Tensile | | Punch | Ironing |
| | Capacity | Surface layer | Lower layer | (surface layer ratio) | strength (MPa) | Forming method | temp. (° C.) | Drawing ratio | ratio (%) |
| Ex. 1 | 350 | IA2 | IA15 | 1:1 (0.50) | 330 | D&I | 30 | 2.2 | 62 |
| Ex. 2 | 350 | IA2.5 | IA15 | 1:3 (0.25) | 270 | D&I | 30 | 2.2 | 62 |
| Ex. 3 | 350 | IA2 | IA15 | 4:1 (0.80) | 420 | D&I | 30 | 2.2 | 62 |
| Ex. 4 | 350 | IA0 | IA15 | 1:3 (0.25) | 290 | D&I | 30 | 2.2 | 62 |
| Ex. 5 | 350 | IA2.5 | IA10 | 1:1 (0.50) | 390 | D&I | 30 | 2.2 | 62 |
| Ex. 6 | 350 | IA2 | IA18 | 1:1 (0.50) | 300 | D&I | 30 | 2.2 | 62 |
| Ex. 7 | 350 | IA2 | IA15 | 1:3 (0.25) | 275 | D&I | 20 | 2.2 | 62 |
| Ex. 8 | 350 | IA2 | IA15 | 1:3 (0.25) | 270 | D&I | 50 | 2.2 | 62 |
| Ex. 9 | 250 | IA2 | IA15 | 1:1 (0.50) | 340 | D&I | 30 | 2.6 | 63 |
| Ex. 10 | 350 | (single layer of IA8) | | | 340 | D&I | 30 | 2.2 | 62 |
| Comp. Ex. 1 | 350 | IA5 | IA15 | 1:3 (0.25) | 240 | D&I | 30 | 2.2 | 62 |
| Comp. Ex. 2 | 350 | IA2 | IA10 | 4:1 (0.80) | 460 | D&I | 30 | 2.2 | 62 |
| Comp. Ex. 3 | 350 | IA2 | IA15 | 1:1 (0.50) | 330 | SD | 30 | 2.7 | 30 |

TABLE 1-continued

| | Evaluation | | | | |
|---|---|---|---|---|---|
| | Metal exposure occurring ratio | Body wall corrosion resistance | Stab strength | Close adhesion of resin | Overall evaluation |
| Ex. 1 | ○ (0.8%) | ○ | ○ (98.2N) | ○ | ○ |
| Ex. 2 | Δ (2.8%) | ○ | Δ (97.1N) | ○ | Δ |
| Ex. 3 | ○ (0.6%) | ○ | ○ (99.4N) | Δ | Δ |
| Ex. 4 | Δ (2.5%) | ○ | Δ (97.3N) | ○ | Δ |
| Ex. 5 | ○ (0.8%) | ○ | ○ (98.9N) | Δ | Δ |
| Ex. 6 | ○ (1.0%) | ○ | ○ (98.0N) | ○ | ○ |
| Ex. 7 | Δ (2.5%) | ○ | Δ (97.1N) | ○ | Δ |
| Ex. 8 | Δ (2.5%) | ○ | Δ (97.1N) | ○ | Δ |
| Ex. 9 | ○ (0.7%) | ○ | ○ (98.2N) | ○ | ○ |
| Ex. 10 | ○ (0.8%) | ○ | ○ (98.3N) | Δ | Δ |
| Comp. Ex. 1 | X (3.2%) | Δ | Δ (96.9N) | ○ | X |
| Comp. Ex. 2 | ○ (0.6%) | ○ | ○ (99.7N) | X | X |
| Comp. Ex. 3 | X (5.0%) | X | ○ (110N) | ○ | X |

Forming method D&I: Draw-ironing forming
Forming method SD: Stretch-draw forming

INDUSTRIAL APPLICABILITY

The draw-ironed aluminum can of the invention does not permit metal to be exposed, features excellent corrosion resistance on the can body wall, excellent adhesion of resin after the working and excellent corrosion resistance at the wrap-seamed portion. Further, the draw-ironed aluminum can of the invention exhibits improved stab resistance despite the thickness of the resin coating is decreased and is advantageous in economy. Moreover, the method of producing the draw-ironed aluminum can of the invention is capable of producing the draw-ironed aluminum can suppressing the ratio of occurrence of metal exposure maintaining good environmental friendliness, productivity and economy.

Therefore, the draw-ironed aluminum can of the invention is suited for being mass-produced as beverage cans and is, further, useful for being filled with corrosive contents.

The invention claimed is:

1. A draw-ironed aluminum can having a resin coating on at least the inner surface of the can, wherein the coating resin on the inner surface of the can has a tensile strength of 270 to 420 MPa,
said resin coating on the inner surface of the can is of a two-layer constitution comprising a surface layer of a highly crystalline polyester resin and a lower layer of a lowly crystalline polyester resin, and a thickness ratio of the surface layer and the lower layer is 1:5 to 9:1, and
said highly crystalline polyester resin is an ethylene terephthalate type polyester resin containing a copolymer of isophthalic acid in an amount of not less than 0 mol% but less than 3 mol%, and the lowly crystalline polyester resin is an ethylene terephthalate type polyester resin containing the copolymer of isophthalic acid in an amount of 10 to 18 mol%.

* * * * *